United States Patent
Nies et al.

(10) Patent No.: US 8,221,075 B2
(45) Date of Patent: Jul. 17, 2012

(54) SYSTEMS AND METHOD FOR OPERATING A WIND TURBINE HAVING ACTIVE FLOW CONTROL

(75) Inventors: Jacob Johannes Nies, Zwolee (NL); Wouter Haans, The Hague (NL)

(73) Assignee: General Electric Company, Schenactady, NY (US)

( * ) Notice: Subject to any disclaimer, the term of this patent is extended or adjusted under 35 U.S.C. 154(b) by 0 days.

(21) Appl. No.: 12/613,013

(22) Filed: Nov. 5, 2009

(65) Prior Publication Data
US 2010/0135794 A1    Jun. 3, 2010

(51) Int. Cl.
F01D 25/32 (2006.01)
F01D 25/00 (2006.01)
(52) U.S. Cl. ............... 416/1; 416/146 R; 416/231 R
(58) Field of Classification Search .......... 416/1, 146 R, 416/231 R, 232, 241 R
See application file for complete search history.

(56) References Cited

U.S. PATENT DOCUMENTS

| | | | |
|---|---|---|---|
| 3,685,292 A * | 8/1972 | Brown ............... | 60/646 |
| 4,692,095 A | 9/1987 | Lawson-Tancred | |
| 5,275,643 A * | 1/1994 | Usui ............... | 96/188 |
| 5,938,404 A | 8/1999 | Domzalski et al. | |
| 6,629,674 B1 | 10/2003 | Saddoughi et al. | |
| 6,940,185 B2 | 9/2005 | Andersen et al. | |
| 6,972,498 B2 | 12/2005 | Jamieson et al. | |
| 7,354,247 B2 | 4/2008 | Bonnet | |
| 7,363,808 B2 | 4/2008 | Ormel et al. | |
| 7,387,491 B2 | 6/2008 | Saddoughi et al. | |
| 7,420,289 B2 | 9/2008 | Wang et al. | |
| 7,435,057 B2 * | 10/2008 | Parera ............... | 416/231 R |
| 7,582,977 B1 | 9/2009 | Dehlsen | |
| 7,637,715 B2 | 12/2009 | Battisti | |
| 7,802,961 B2 * | 9/2010 | Grabau ............... | 415/4.3 |
| 2001/0038798 A1 | 11/2001 | Foster | |
| 2005/0042102 A1 | 2/2005 | Teichert | |
| 2005/0242233 A1 | 11/2005 | Battisti | |
| 2007/0231151 A1 | 10/2007 | Herr et al. | |
| 2008/0181775 A1 * | 7/2008 | Livingston et al. ............... | 416/95 |
| 2009/0140862 A1 | 6/2009 | Eggleston | |
| 2009/0304505 A1 | 12/2009 | Wobben | |

(Continued)

FOREIGN PATENT DOCUMENTS

DE    10 2006 032 387 A1    1/2008

(Continued)

OTHER PUBLICATIONS

Office Action dated Oct. 5, 2010, U.S. Appl. No. 12/613,170, 21 pages.

(Continued)

Primary Examiner — Edward Look
Assistant Examiner — Sean J Younger
(74) Attorney, Agent, or Firm — James McGinness; Armstrong Teasdale LLP

(57) ABSTRACT

A method for operating a wind turbine includes operatively coupling a fluid container within the wind turbine. The fluid container is in flow communication with an air distribution system at least partially defined within a blade of the wind turbine. The method further includes channeling a fluid from the fluid container into the air distribution system, and discharging the fluid from the air distribution system through at least one aperture of the air distribution system defined through an outer surface of the blade to facilitate removing debris from the air distribution system.

19 Claims, 7 Drawing Sheets

U.S. PATENT DOCUMENTS

| | | |
|---|---|---|
| 2009/0311097 A1 | 12/2009 | Pierce et al. |
| 2010/0076614 A1 | 3/2010 | Nies et al. |
| 2010/0135790 A1 | 6/2010 | Pal et al. |
| 2010/0135794 A1 | 6/2010 | Nies et al. |
| 2010/0135795 A1 | 6/2010 | Nies et al. |

FOREIGN PATENT DOCUMENTS

| | | |
|---|---|---|
| EP | 1517033 A1 | 3/2005 |
| GB | 2186033 A | 8/1987 |
| GB | 2466433 A | 6/2010 |
| WO | 2004092577 A1 | 10/2004 |
| WO | 2008080407 A1 | 7/2008 |

OTHER PUBLICATIONS

Office Action dated Aug. 19, 2010, U.S. Appl. No. 12/613,274, 17 pages.

David F. Fisher & Michael C. Fischer, Development Flight Tests of Jetstar LFC Leading-Edge Flight Test Experiment, (NASA, Langley Research Center ed., 1987).

Gustave P. Corten & Herman F. Veldkamp, "Insects Can Halve Wind-Turbine Power," 412 Nature, 42-43 (2001).

Albert L Braslow, "A History of Suction-Type Laminar-Flow Control with Emphasis on Flight Research," Monographs in Aerospace History, No. 13, pp. 20, 21, 24 (1999).

Hal Romanowitz, "Alternate Energy Systems Engineering," available at www.oakcreekenergy.com/reports/flash/GCI-20020401.html (last visited Mar. 2, 2009).

www.co/9.com/portal/fasf/ien/dt.jsp?setCursor=1_314889; EC European Coatings Show 2009 "COL. 9® Anti-Aging for Facades"; Nuremberg, Germany, Mar. 31-Apr. 2, 2009; copyright 2006 BASF Aktiengesellschaft; 1 page.

www2.dupont.com/Teflon_Industrial/en_US/products/product_...; "Industrial Coatings"; copyright 2009 DuPont; p. 1.

www.basf.com/groug/corporate/en/news-and-media-relations/sc...; "Science around us: Emulating nature-self-cleaning effects for textiles . . ."; copyright 2009; p. 2.

www.sabic-ip.com/gep/Plastics/en/ProductsAndServices/ProductLine/lexan.html; "SABIC Innovative Plastics™"; copyright 2007 SABIC Innovative Plastics Holding BV; pp. 1-3.

* cited by examiner

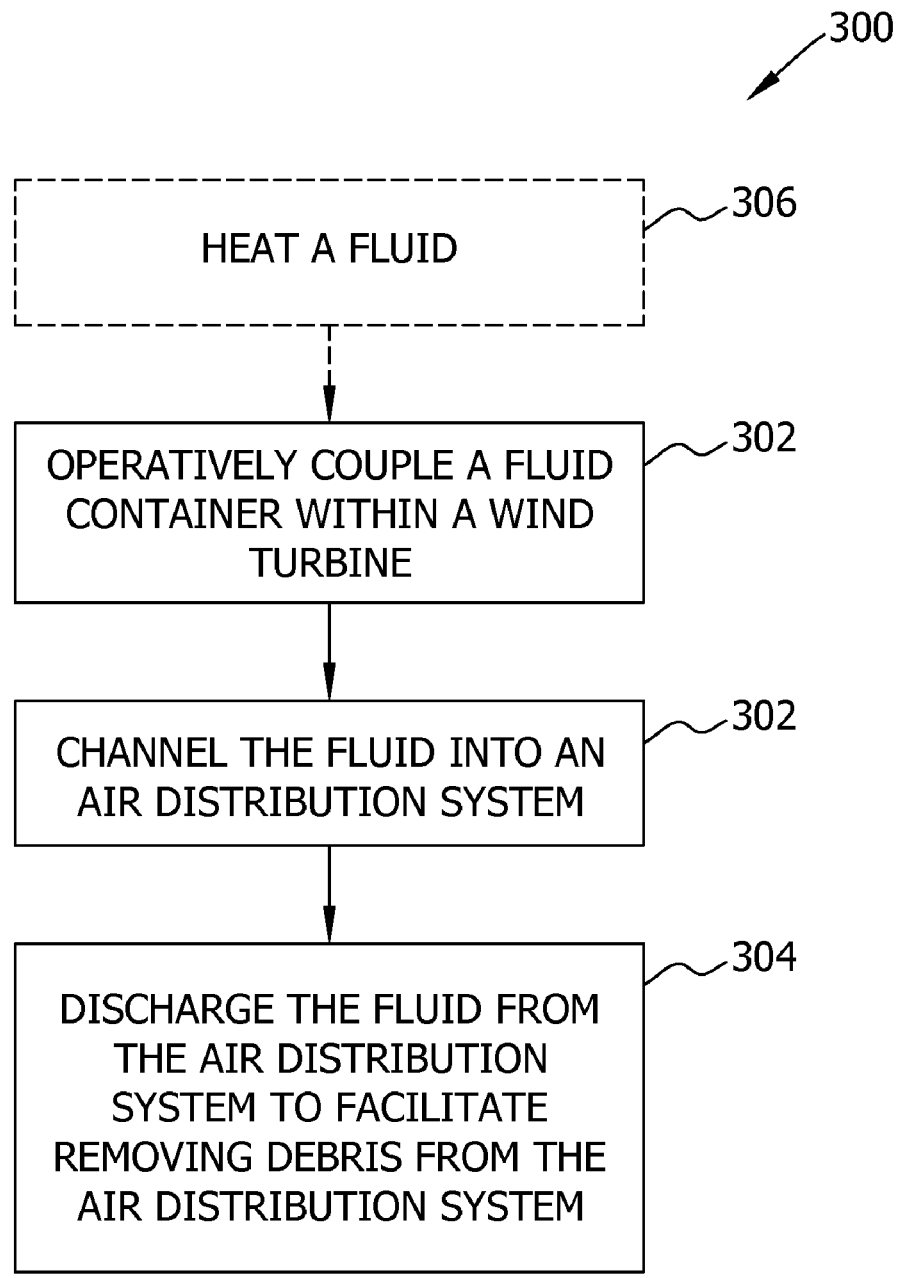

SYSTEMS AND METHOD FOR OPERATING A WIND TURBINE HAVING ACTIVE FLOW CONTROL

CROSS REFERENCE TO RELATED APPLICATIONS

Cross-reference is hereby made to related, commonly assigned, applications: U.S. Ser. No. 12/613,079 entitled "Method for Operating a Wind Turbine with Reduced Blade Fouling" and published as U.S. Pub. No. 2010/0143121; U.S. Ser. No. 12/613,157 entitled "Active Flow Control System for Wind Turbine" and issued as U.S. Pat. No. 7,883,313; U.S. Ser. No. 12/613,287 entitled "Systems and Methods for Assembling an Air Distribution System for Use in a Rotor Blade of a Wind Turbine" and published as U.S. Pub. No. 2011/0103953; U.S. Ser. No. 12/613,268 entitled "Apparatus and Method for Cleaning an Active Flow Control (AFC) System of a Wind Turbine" and issued as U.S. Pat. No. 7,931,445; U.S. Ser. No. 12/613,170 entitled "Systems and Method for Operating an Active Flow Control System" and issued as U.S. Pat. No. 8,047,783; and U.S. Ser. No. 12/613,274 entitled "Systems and Method for Operating a Wind Turbine Having Active Flow Control" and published as U.S. Pub. No. 2010/0076614. Each cross-referenced application is invented by Jacob Johannes Nies and Wouter Haans and is filed on the same day as this application. Each cross-referenced application is hereby incorporated by reference in its entirety.

BACKGROUND OF THE INVENTION

The embodiments described herein relate generally to methods and systems for operating a wind turbine having an active flow control system and, more particularly, to methods and systems for removing debris from the active flow control system and/or preventing an accumulation of debris within the active flow control system.

Active Flow Control (AFC) is a general term for technologies and/or systems that actively attempt to influence an aerodynamic response of an object in reaction to given in-flow conditions. More specifically, at least some known AFC systems are used to manipulate flow conditions across an airfoil. As used herein, the term "airfoil" refers to a turbine blade, a wing, and/or any other suitable airfoil. Although the embodiments described herein refer to a turbine blade, it should be understood that the embodiments described herein may be used with any suitable airfoils. In contrast to known passive flow control systems that provide substantially constant flow control, known AFC systems enable flow control to be selectively applied to an airfoil. At least some known AFC systems use air distribution systems to manipulate a boundary layer of air flowing across a surface of an airfoil. Known AFC systems include actuators that can be divided in two categories, depending on their net-mass-flow. The first category is zero-net-mass-flow actuators, such as synthetic jet actuators, and the second category is nonzero-net-mass-flow actuators, such as air ejection actuators, which may be steady or unsteady and/or blowing and/or suction actuators.

Because AFC systems are subjected to fluid flows that can contain debris, fouling of AFC perforations and/or apertures by debris is one of the obstacles for wide scale application of AFC on wind turbine blades, aircraft wings, and other airfoils. As used herein, the term "debris" refers to dirt, dust, insects, insect remains, particles, particulates, substances, suspended liquids and/or solids, and/or any other material that may contact and accumulate in and/or on the wind turbine blades and/or other airfoils. Further, the terms "perforation" and "aperture" can be used interchangeably throughout this application.

In general, fouling of the AFC apertures by debris has an adverse effect on AFC system performance. Further, components, other than the perforations, of at least some known AFC systems are susceptible to fouling as well. For example, in at least some known nonzero-net-mass-flow systems, ambient air, possibly polluted with debris, is drawn into the AFC system to feed the actuators. Such polluted intake air may foul the air distribution system, the actuators, and/or the perforations of the AFC system.

Such fouling of the perforations and/or other components of known AFC systems may alter fluid flows across an airfoil such that the fluid flows deviate from clean-state fluid flows for which the blade is designed to yield. Additionally, fouling on blade surfaces and/or within AFC systems may reduce a power output of a system using airfoils and/or an AFC system, such as a wind turbine. However, manually cleaning each aperture of an AFC system is not practical because of a number of apertures in at least some known AFC systems and/or a duration of time that is required for the wind turbine to be offline for such manual cleaning.

Accordingly, it is desirable to provide a method and/or system for cleaning an AFC system and/or preventing fouling of an AFC system. Further, it is desirable to provide a method and/or system for cleaning and/or preventing fouling of a blade surface. Moreover, such methods and/or systems preferably do not include manual cleaning of the AFC system and/or blade.

BRIEF DESCRIPTION OF THE INVENTION

In one aspect, a method for operating a wind turbine is provided. The method includes operatively coupling a fluid container within the wind turbine. The fluid container is in flow communication with an air distribution system at least partially defined within a blade of the wind turbine. The method further includes channeling a fluid from the fluid container into the air distribution system, and discharging the fluid from the air distribution system through at least one aperture of the air distribution system defined through an outer surface of the blade to facilitate removing debris from the air distribution system.

In another aspect, a fluid distribution system for use in a wind turbine including an air distribution system at least partially defined within a blade of the wind turbine is provided. The fluid distribution system includes a fluid container positioned within the wind turbine. The fluid container includes a fluid inlet and is configured to contain a fluid therein. The fluid distribution system further includes a conduit in flow communication with the fluid container. The conduit is configured to channel the fluid from the fluid container into the air distribution system for discharge through at least one aperture of the air distribution system to facilitate removing debris from the air distribution system.

In yet another aspect, a wind turbine is provided. The wind turbine includes at least one blade, and an air distribution system at least partially defined within the blade. The air distribution system includes at least one aperture defined through an outer surface of the blade. The wind turbine further includes a fluid distribution system configured to facilitate removing debris from the air distribution system. The fluid distribution system includes a fluid container having a fluid inlet and configured to contain a fluid. A conduit is in flow communication with the fluid container. The conduit is configured to channel the fluid from the fluid container into the air distribution system for discharge through the aperture.

By including a fluid distribution system, the embodiments described herein facilitate cleaning and maintaining an active flow control system within a blade of a wind turbine. More specifically, a fluid is channeled from the fluid distribution system into an air distribution system for correcting and/or preventing fouling of the air distribution system.

BRIEF DESCRIPTION OF THE DRAWINGS

FIGS. 1-7 show exemplary embodiments of the systems and method described herein.

FIG. 1 is a perspective view of an exemplary wind turbine.

FIG. 2 is schematic view of an exemplary flow control system that may be used with the wind turbine shown in FIG. 1.

FIG. 3 is schematic view of an exemplary fluid distribution system that may be used with the flow control system shown in FIG. 2.

FIG. 4 is a schematic view of an exemplary alternative flow control system that may be used with the wind turbine shown in FIG. 1.

FIG. 5 is an enlarged cross-sectional view of a portion of the flow control system shown in FIG. 4.

FIG. 6 is a schematic view of an exemplary fluid distribution system that may be used with the flow control system shown in FIG. 4.

FIG. 7 is a flowchart of an exemplary method for operating a wind turbine that may be used with the flow control systems shown in FIGS. 2 and 4.

DETAILED DESCRIPTION OF THE INVENTION

The embodiments described herein include an active flow control (AFC) system that ejects air through surface apertures and/or perforations to facilitate controlling flow separation on an airfoil, such as a wind turbine blade. The methods and systems described herein facilitate correcting and/or preventing fouling of the AFC system and/or blade surfaces. More specifically, the embodiments described herein channel an agent, such as water, soap, and/or a protein solvent, into an air distribution system of the AFC system. In one embodiment, the agent is channeled directly into the air distribution system from inside a blade. In an alternative embodiment, the agent is channeled into the air distribution system from outside the blade by spraying the agent through nozzles in a wind turbine tower. One or more agents may be used singly, in combination, and/or in a sequence to correct and/or prevent fouling of the AFC system and/or blade. The preventive and/or corrective methods can be performed periodically and/or selectively, such as upon determining that fouling is taking, or has taken, place.

Figure 1:
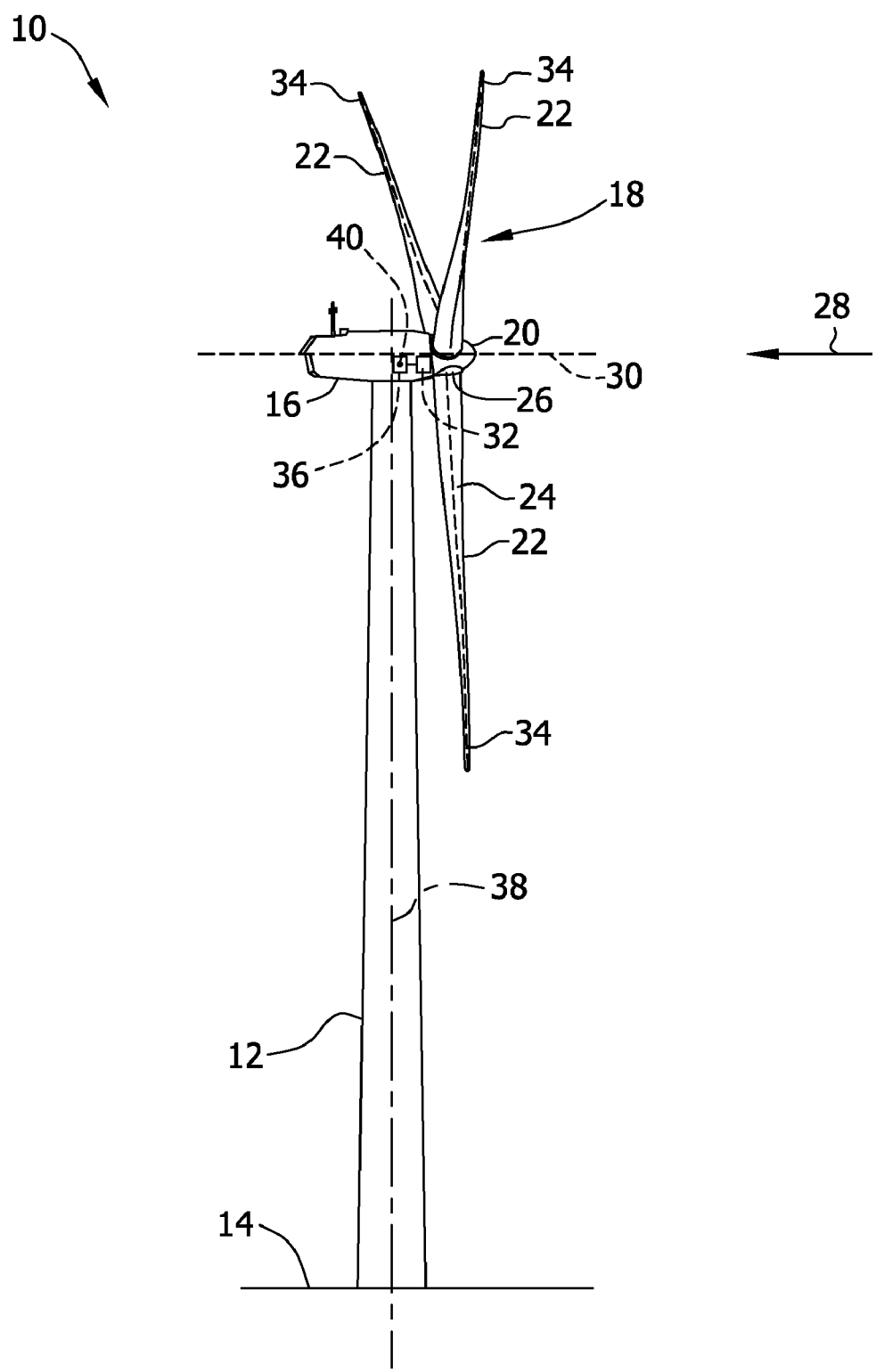

FIG. 1 is a perspective view of an exemplary wind turbine 10. In the exemplary embodiment, wind turbine 10 is a nearly horizontal-axis wind turbine, however, wind turbine 10 may have any suitable tilt angle. Alternatively, wind turbine 10 may be a vertical axis wind turbine. In the exemplary embodiment, wind turbine 10 includes a tower 12 that extends from a supporting surface 14, a nacelle 16 mounted on tower 12, and a rotor 18 that is coupled to nacelle 16. Rotor 18 includes a rotatable hub 20 and at least one blade 22 coupled to and extending outward from hub 20. In the exemplary embodiment, rotor 18 has three blades 22. In an alternative embodiment, rotor 18 includes more or less than three blades 22. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower. A height of tower 12 is selected based upon factors and conditions known in the art.

Blades 22 are spaced about hub 20 to facilitate rotating rotor 18 to enable kinetic energy to be transferred from the wind into usable mechanical energy, and subsequently, electrical energy. Blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to blades 22 are transferred to hub 20 via load transfer regions 26.

In the exemplary embodiment, blades 22 have a length of between approximately 30 meters (m) (99 feet (ft)) and approximately 120 m (394 ft). Alternatively, blades 22 may have any length that enables wind turbine 10 to function as described herein. As wind strikes blades 22 from a direction 28, rotor 18 is rotated about an axis of rotation 30. As blades 22 are rotated and subjected to centrifugal forces, blades 22 are also subjected to various forces and moments. As such, blades 22 may deflect and/or rotate from a neutral, or non-deflected, position to a deflected position. Moreover, a pitch angle of blades 22, i.e., an angle that determines a perspective of blades 22 with respect to a rotor plane, may be changed by a pitch adjustment system 32 to control power, load, and/or noise generated by wind turbine 10 by adjusting an angular position of a profile of at least one blade 22 relative to wind vector. Pitch axes 34 for blades 22 are illustrated. In the exemplary embodiment, a pitch of each blade 22 is controlled individually by a control system 36. Alternatively, the blade pitch for all blades may be controlled simultaneously by control system 36. Further, in the exemplary embodiment, as direction 28 changes, a yaw direction of nacelle 16 may be controlled about a yaw axis 38 to position blades 22 with respect to direction 28.

In the exemplary embodiment, control system 36 is shown as being centralized with in nacelle 16, however control system 36 may be a distributed system throughout wind turbine 10, on supporting surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands. The execution of sequences of instructions is not limited to any specific combination of hardware circuitry and software instructions.

Figure 2:
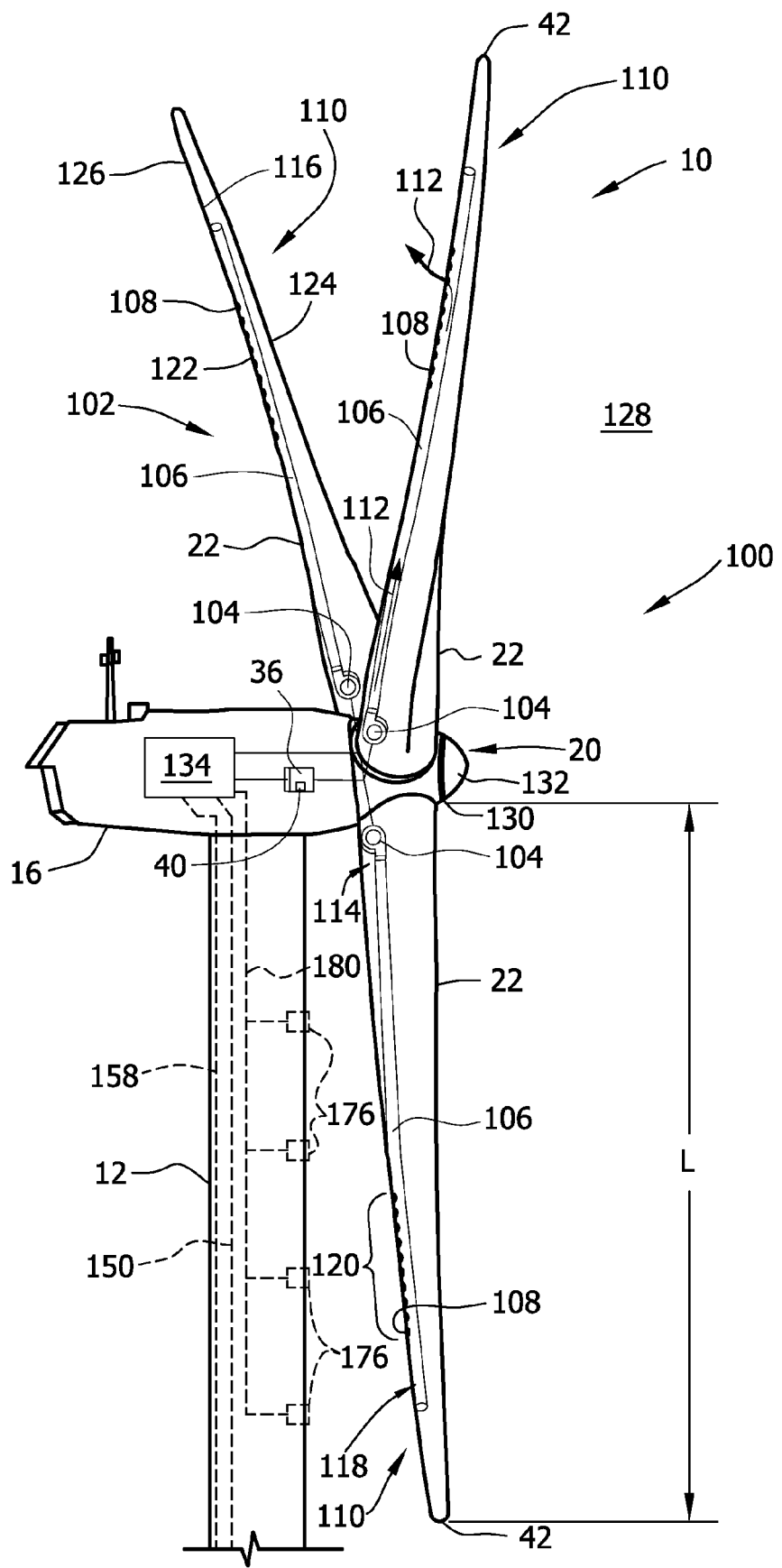
Figure 3:
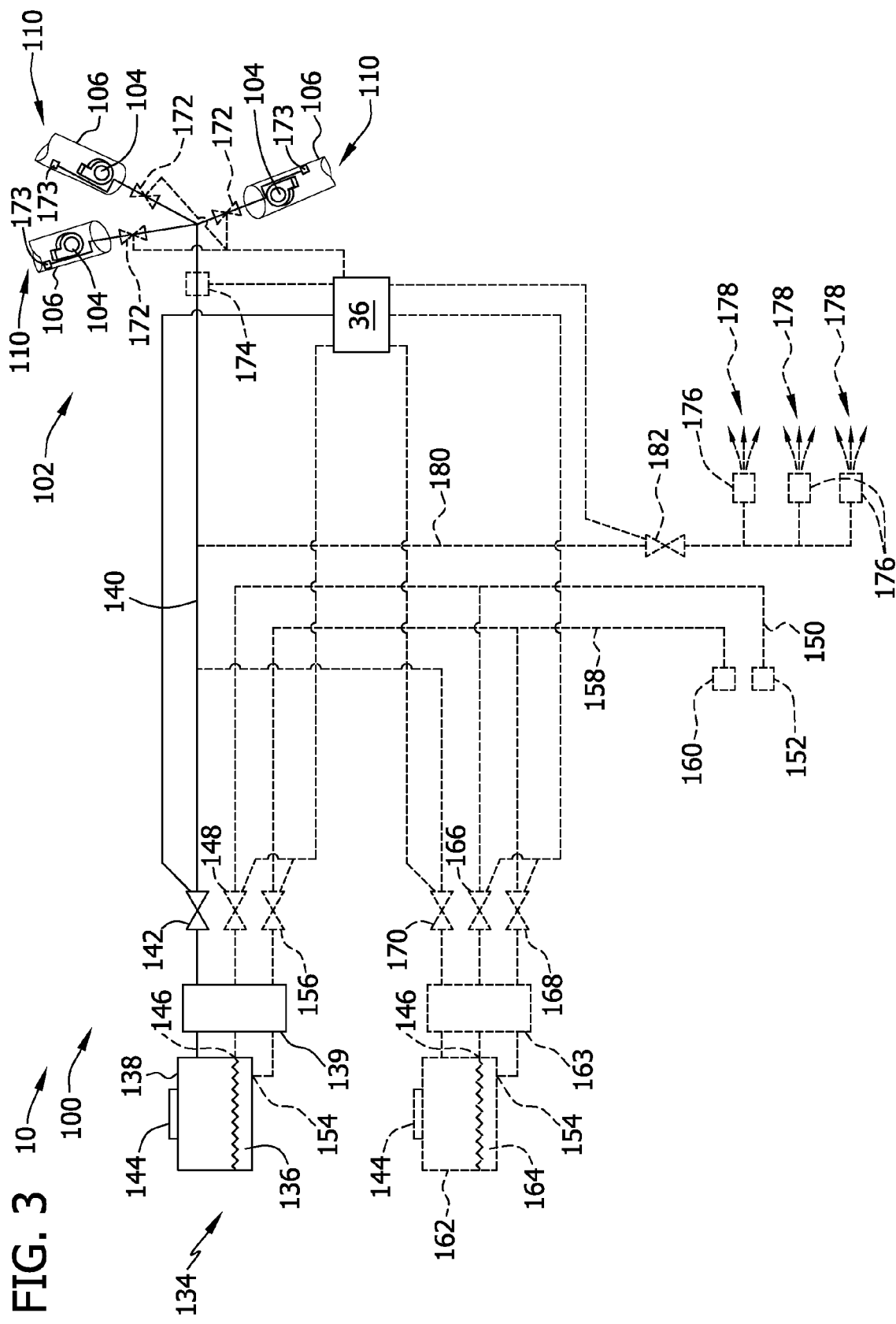

FIG. 2 is a schematic view of an exemplary flow control system 100 that may be used with wind turbine 10. FIG. 3 is a schematic view of an exemplary fluid distribution system 134 that may be used with flow control system 100. Additional and/or alternative components are indicated by dashed lines. In the exemplary embodiment, flow control system 100 is a nonzero-net-mass flow control system that includes an air distribution system 102. Control system 36 is in operational control communication with flow control system 100 and/or air distribution system 102. As used herein, "operational control communication" refers to a link, such as a conductor, a wire, and/or a data link, between two or more components of wind turbine 10 that enables signals, electric currents, and/or commands to be communicated between the two or more components. The link is configured to enable one component to control an operation of another component of wind turbine 10 using the communicated signals, electric currents, and/or commands.

Air distribution system 102 includes at least one flow control device 104, at least one manifold 106, and at least one aperture 108. At least one flow control device 104, a respective manifold 106, and one or more corresponding apertures 108 form an assembly 110. Each blade 22 includes an assembly 110 at least partially defined therein. As such, air distribution system 102 includes a plurality of flow control devices 104, a plurality of manifolds 106, and a plurality of apertures 108. Alternatively, at least one blade 22 includes an assembly 110. In the exemplary embodiment, each assembly 110 is substantially similar, however, at least one assembly 110 may be different than at least one other assembly 110. Further, although in the exemplary embodiment each assembly 110 includes a flow control device 104, at least two assemblies 110 may share a common flow control device 104.

Flow control device 104 is, for example, a pump, a compressor, a fan, a blower, and/or any other suitable device for controlling a flow of a fluid. In one embodiment, flow control device 104 and/or assembly 110 includes a valve (not shown) that is configured to regulate a flow within air distribution system 102, such as a flow rate and/or a flow direction. In the exemplary embodiment, flow control device 104 is reversible for changing a direction of a fluid flow 112. Further, in the exemplary embodiment, air distribution system 102 includes one flow control device 104 for each blade 22 of wind turbine 10, however, it should be understood that air distribution system 102 can include any suitable number of flow control devices 104. Control system 36 is in operational control communication with each flow control device 104 for controlling fluid flows through air distribution system 102. Control system 36 may be directly coupled in operational control communication with each flow control device 104 and/or may be coupled in operational control communication with each flow control device 104 via a communication hub and/or any other suitable communication device(s).

Each flow control device 104 is in flow communication with at least one manifold 106. When one centralized flow control device 104 is used, flow control device 104 is in flow communication with each manifold 106 of air distribution system 102. In the exemplary embodiment, a flow control device 104 is coupled within a respective blade 22 at a root end 114 of each manifold 106 and/or blade root portion 24 of each blade 22. Alternatively, flow control device 104 may be in any suitable position within wind turbine 10 and/or on supporting surface 14 (shown in FIG. 1) with respect to at least one manifold 106.

In the exemplary embodiment, each manifold 106 is at least partially defined along an interior surface 116 within respective blade 22 and extends generally along a respective pitch axis 34 (shown in FIG. 1) from root end 114 of manifold 106 to a tip end 118 of manifold 106. It should be understood that tip end 118 is not necessarily positioned within a tip 42 of blade 22, but rather, is positioned nearer to tip 42 than manifold root end 114 is. In one embodiment, apertures 108 are defined at a predetermined portion 120 of a length L of blade 22 from root end 114 within tip end 118. Further, it should be understood that manifold 106 may have any suitable configuration, cross-sectional shape, length, and/or dimensions that enables air distribution system 102 and/or flow control system 100 to function as described herein. It should also be understood that one or more components of blade 22 can be used to form manifold 106.

In the exemplary embodiment, air distribution system 102 also includes at least one aperture 108 in flow communication with respective manifold 106. More specifically, in the exemplary embodiment, air distribution system 102 includes a plurality of apertures 108 defined along a suction side 122 of respective blade 22. Although apertures 108 are shown as being aligned in a line along suction side 122, it should be understood that apertures 108 may be positioned anywhere along suction side 122 of blade 22 that enables flow control system 100 to function as described herein. Alternatively or additionally, apertures 108 are defined through a pressure side 124 of blade 22. In the exemplary embodiment, aperture 108 is defined though an outer surface 126 of blade 22 for providing flow communication between manifold 106 and ambient air 128.

Flow control devices 104 are, in the exemplary embodiment, in flow communication with ambient air 128 via an opening 130 defined between hub 20 and a hub cover 132. Alternatively, wind turbine 10 does not include hub cover 132, and ambient air 128 is drawn into air distribution system 102 through an opening 130 near hub 20. In the exemplary embodiment, flow control devices 104 are configured to draw in ambient air 128 though opening 130 and to discharge fluid flow 112 generated from ambient air 128 into respective manifold 106. Alternatively, opening 130 may be defined at any suitable location within hub 20, nacelle 16, blade 22, tower 12, and/or auxiliary device (not shown) that enables air distribution system 102 to function as described herein. Further, air distribution system 102 may include more than one opening 130 for drawing air into air distribution system 102, such as including one or more openings 130 for each flow control device 104. In an alternative embodiment, a filter is included within opening 130 for filtering air 128 entering air distribution system 102. It should be understood that the filter referred to herein can filter particles from a fluid flow and/or separate liquid from the fluid flow.

Referring further to FIG. 3, flow control system 100 also includes, in the exemplary embodiment, fluid distribution system 134. In the exemplary embodiment, fluid 136 used within fluid distribution system 134 is, for example, water, a soap and/or a detergent, a non-freezing cleaning agent, a protein solvent, a de-icing agent, and/or a non-binding coating agent. In one embodiment, the soap and/or detergent is foamed soap and/or detergent. When fluid 136 is a non-binding coating agent, fluid 136 is, for example, a hydrophobic surface coating, a drag reducing coating, an anti-fouling silicon coating, a nano-material coating, and/or a dirt-repellent coating, such as Teflon® (Teflon is a trademark of E. I. du Pont de Nemours and Company of Wilmington, Del.), Mincor® TX TT (Mincor is a registered trademark of BASF Aktiengesellschaft of Ludwigshafen, Germany ("BASF"), COL.9® (COL.9 is a registered trademark of BASF), and/or Lexan® (Lexan is a registered trademark of SABIC Innovative Plastics IP B.V. Company of Bergen op Zoom, The Netherlands). Further, the non-binding coating agent can be applied to a surface and/or a mesh of a filter within opening 130, components of air distribution system 102, ducting, pumps, blowers, and/or valves within wind turbine 10, and/or apertures 108 and/or a surface near aperture 108.

Fluid distribution system 134 includes a fluid container 138, a pump 139, and a conduit 140 in flow communication with fluid container 138. Conduit 140 is configured to channel fluid 136 to at least one assembly 110. Pump 139 is configured to discharge fluid 136 from container 138 into conduit 140. A valve 142 is coupled between pump 139 and assembly 110 for selectively controlling a flow of fluid 136 to assembly 110. Control system 36 is in operational control communication with pump 139 and/or valve 142 and is configured to control pump 139 and/or valve 142. Alternatively, fluid distribution system 134 does not include pump 139 and fluid 136 is drawn from container 138 by centrifugal force. In the exemplary embodiment, fluid container 138 includes a fluid inlet 144 and is configured to contain or hold fluid 136. In the exemplary embodiment, fluid inlet 144 is defined through nacelle 16 and is configured to collect precipitation from ambient air 128. In one embodiment, fluid inlet 144 is configured to collect rain and/or snow for retention in fluid container 138.

In an alternative embodiment, conduit 140 is in flow communication with a fluid supply system on, or under, the ground. The fluid supply system is configured to continuously supply a fluid to fluid distribution system 134. As such, fluid distribution system 134 may or may not include container 138 and/or pump 139. Rather, flow from the fluid supply system to conduit 140 is controlled by valve 142. Examples of the fluid supply system include a public water supply system and/or a dedicated fluid supply system within a wind farm.

Additionally or alternatively, fluid container 138, includes a fluid inlet 146 in flow communication, via a valve 148, with an intake conduit 150 that extends from nacelle 16 through tower 12, to an inlet opening 152 near supporting surface 14 (shown in FIG. 1). Fluid container 138 additionally or alternatively includes a fluid outlet 154 in flow communication, via a valve 156, with an outlet conduit 158 that extends from nacelle 16, through tower 12, to an outlet opening 160 near supporting surface 14. In one embodiment, fluid 136 is channeled through inlet opening 152 into intake conduit 150 to fluid container 138. Alternatively, or additionally, fluid 136 can be removed from fluid container 138 via outlet conduit 158 to outlet opening 160 for removing and/or exchanging fluid 136 in fluid container 138.

Control system 36 is in operational control communication with valves 148 and/or 156 for controlling a flow of fluid 136 through valves 148 and/or 156. In one embodiment, fluid 136 is delivered to intake conduit 150 and/or fluid 136 is removed from outlet conduit 158 via a truck, a boat, and/or any suitable mobile vehicle or vessel. More specifically, the vehicle or vessel includes a container and a pumping device for pumping fluid from the vehicle or vessel container into fluid distribution system 134 via intake conduit 152 and/or for pumping fluid 136 from fluid container 138 into the vessel container via the outlet conduit 158.

Alternatively, fluid distribution system 134 includes more than one fluid container. For example, fluid distribution system 134 includes fluid container 138 and a second fluid container 162 and a second pump 163. Second fluid container 162 is configured to contain a second fluid 164. Second fluid 164 may be the same fluid as fluid 136 or a different fluid than fluid 136. Second fluid container 162 is configured similarly to fluid container 138 and includes fluid inlet 144 that can be configured to collect precipitation and/or fluid inlet 146 in flow communication with intake conduit 150 via a valve 166. Pump 163 is configured similarly to pump 139. Additionally, or alternatively, second fluid container 162 includes fluid outlet 154 in flow communication with outlet conduit 158 via a valve 168. Control system 36 is in operational control communication with valves 166 and/or 168, if present in fluid distribution system 134. Further, when more than one fluid container is present within fluid distribution system 134, second fluid container 162 is in flow communication with conduit 140 via a valve 170 that is controlled by control system 36. As such, fluid 136 and/or fluid 164 may be channeled to at least one assembly 110 via conduit 140, singly, in combination, and/or in series.

In the exemplary embodiment, conduit 140 is in flow communication with air distribution system 102 for channeling fluid 136 into air distribution system 102. More specifically, conduit 140 channels fluid 136 to at least one assembly 110 for cleaning and/or preventing fouling of fluid control device 104, manifold 106, and/or apertures 108. In the exemplary embodiment, conduit 140 is in flow communication with each assembly 110 of flow control system 100. Each assembly 110 can include a valve 172 for selectively controlling fluid delivery into one or more assemblies 110. For example, it may be determined that one assembly 110 has debris accumulation therein, while other assemblies 110 have no such accumulation. Control system 36 can control valves 172 such that fluid 136 is only channeled to assembly 110 that is fouled. In the exemplary embodiment, conduit 140 channels fluid 136 into manifold 106 through a nozzle 173 for cleaning and/or preventing fouling of components of manifold 106. Nozzle 173 is configured to produce a spray of fluid 136 into manifold 106. Nozzle 173 may be in any suitable position along manifold 106.

Alternatively, conduit 140 is in flow communication with flow control device 104 for cleaning flow control device 104 and manifold 106. Nozzle 173 may or may not be included in such an embodiment. When nozzle 173 is included, nozzle 173 produces a spray of fluid 136 into flow control device 104. When nozzle 173 is not included, conduit 140 discharges fluid 136 into flow control device 104. In a particular embodiment, fluid distribution system 102 includes a temperature control device 174 operationally coupled to, such as positioned along, conduit 140 for adjusting a temperature of fluid 136 before fluid 136 enters assembly 110. For example, temperature control device 174 heats fluid 136 before fluid 136 is discharged into assembly 110.

Referring further to FIG. 3, in an alternative embodiment, fluid distribution system 134 includes at least one nozzle 176 coupled to tower 12 and extending through an outer surface 44 of tower 12. More specifically, nozzles 176 are defined in tower 12 in positions that facilitate directing a stream 178 of fluid 136 toward at least one blade 22 as blade 22 passes tower 12. Nozzles 176 are in flow communication with fluid container 138 and/or second fluid container 162 via a secondary conduit 180 for delivering fluid 136 and/or second fluid 164 through nozzles 176 for discharge from nozzles 176 positioned through outer surface 44 of tower 12. A valve 182 is coupled between nozzles 176 and conduit 140 for selectively channeling fluid 136 and/or second fluid 164 to nozzles 176 via secondary conduit 180. It should be understood that while one valve 182 is described herein, fluid distribution system 134 can include a valve at each nozzle 176 for selectively discharging fluid 136 and/or second fluid 164 from 176 when fluid distribution system 134 includes more than one nozzle 176.

It should further be understood that fluid distribution system 134 may include other suitable component to facilitate cleaning and/or maintaining components of wind turbine 10 depending on a configuration of wind turbine 10. For example, fluid distribution system 134 can be adapted for cleaning a leading edge of blade 22 and/or a hub enclosure, such as hub cover 132, by adding suitable pipes and/or conduits.

During a flow control operation, flow control system 100 is used to provide AFC for wind turbine 10. More specifically, control system 36 controls air distribution system 102 to draw in ambient air 128 and discharge a fluid flow 112 through at least one aperture 108. Operation of one assembly 110 will be described herein, however, it should be understood that in one embodiment each assembly 110 functions similarly. Further, assemblies 110 can be controlled to operate in substantial synchronicity and/or each assembly 110 may be controlled separately such that a fluid flow about each blade 22 may be manipulated separately. When assemblies 110 are controlled in synchronicity, flow control system 100 can be controlled by control system 36 to maintain a predetermined load spectrum, power level, and/or noise level. In the exemplary embodiment, control system 36 controls flow control device 104 to draw in ambient air 128 to generate fluid flow 112 having one or more predetermined parameters, such as a velocity, a mass flow rate, a pressure, a temperature, and/or any suitable flow parameter. Flow control device 104 channels fluid flow 112 through manifold 106 from root end 114 to tip end 118. It should be understood that any suitable control methods and/or components, such as pitching blade(s) 22, can alternatively or additionally be used to control a load spectrum, a power level, and/or a noise level of wind turbine 10.

As fluid flow 112 is channeled through manifold 106, fluid flow 112 is discharged from air distribution system 102 and flow control system 100 through apertures 108. Discharged fluid flow 112 facilitates manipulating at least a boundary layer of a fluid flow across outer surface 126 of blade 22. More specifically, discharging fluid flow 112 at suction side 122 of blade 22 increases the lift on blade 22, which increases the power generated by wind turbine 10. Alternatively, flow control device 104 may be operated to draw in ambient air 128 through apertures 108 into manifold 106 for discharge from nacelle 16, hub 20, and/or any other suitable location. As such, ambient air 128 is drawn in from the boundary layer to manipulate the boundary layer.

Figure 4:
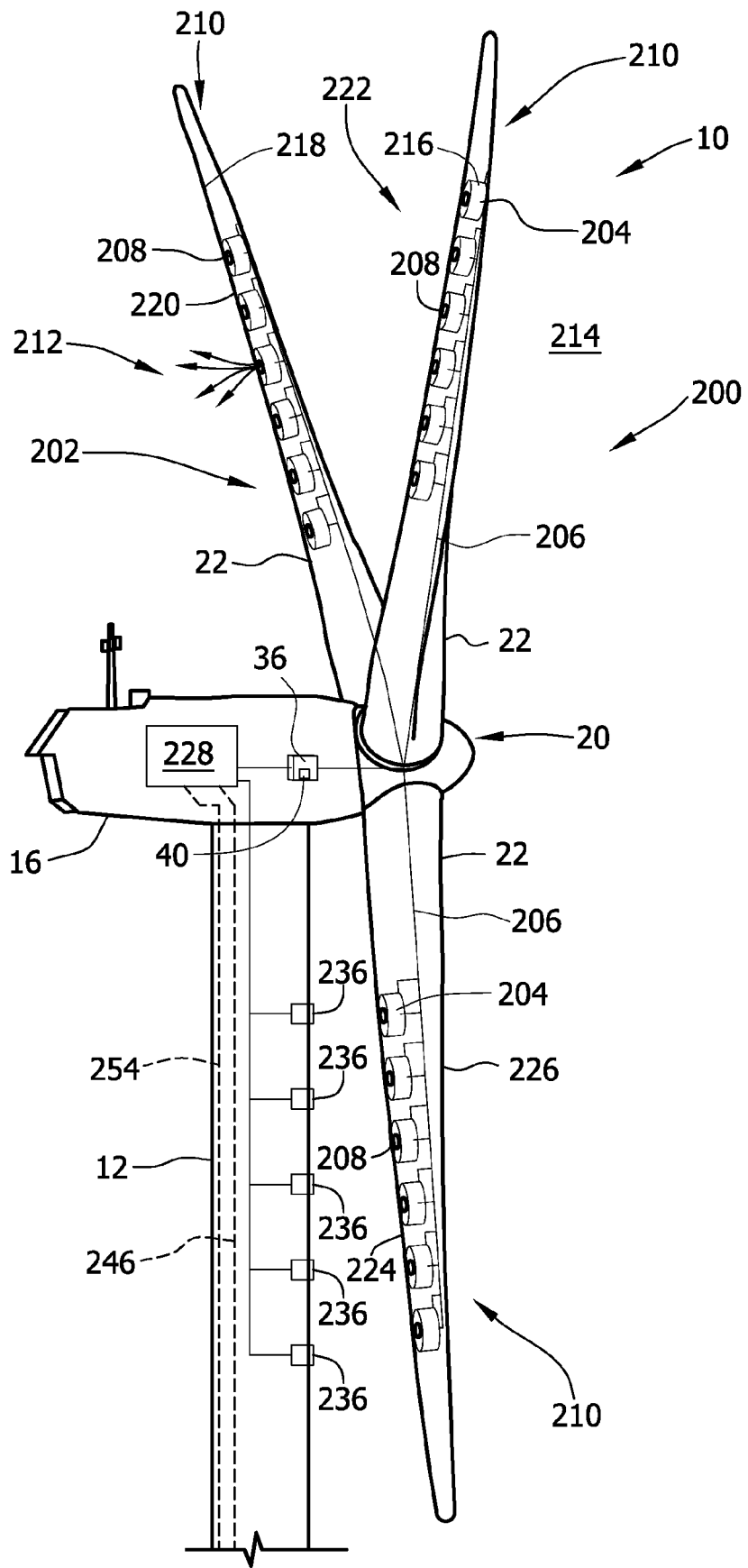
Figure 5:
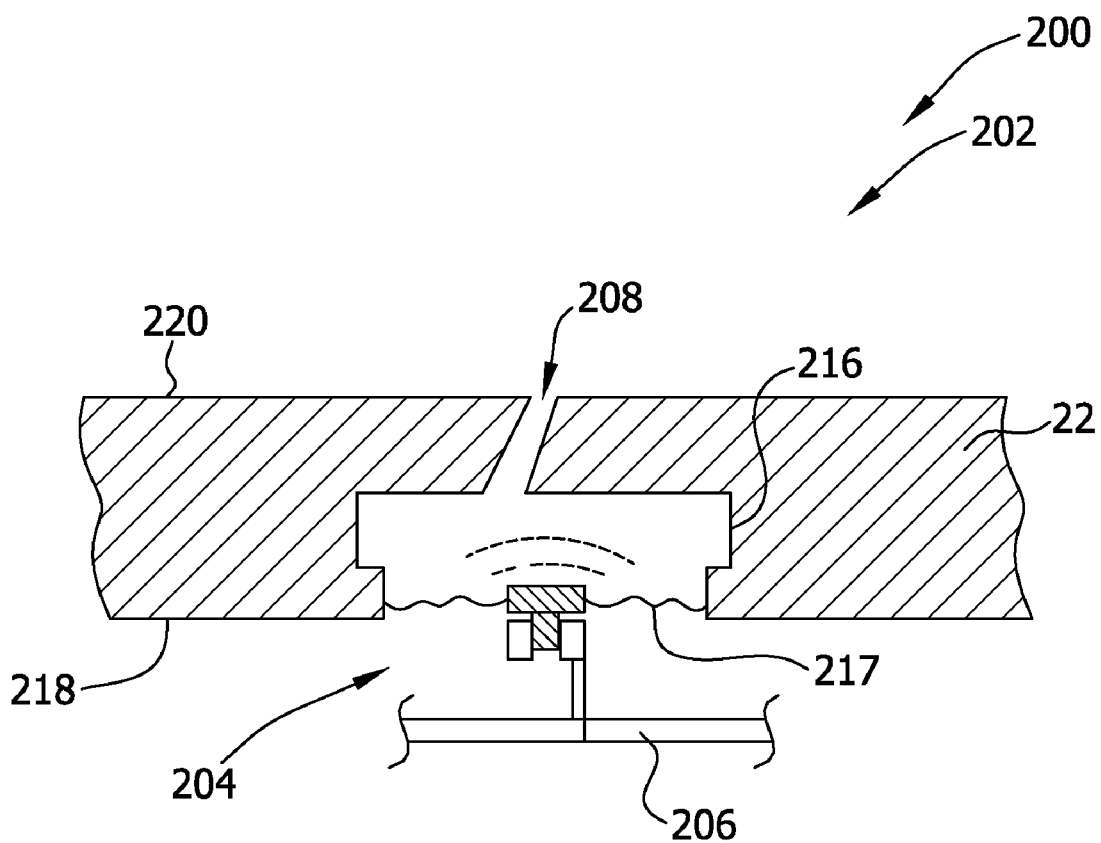
Figure 6:
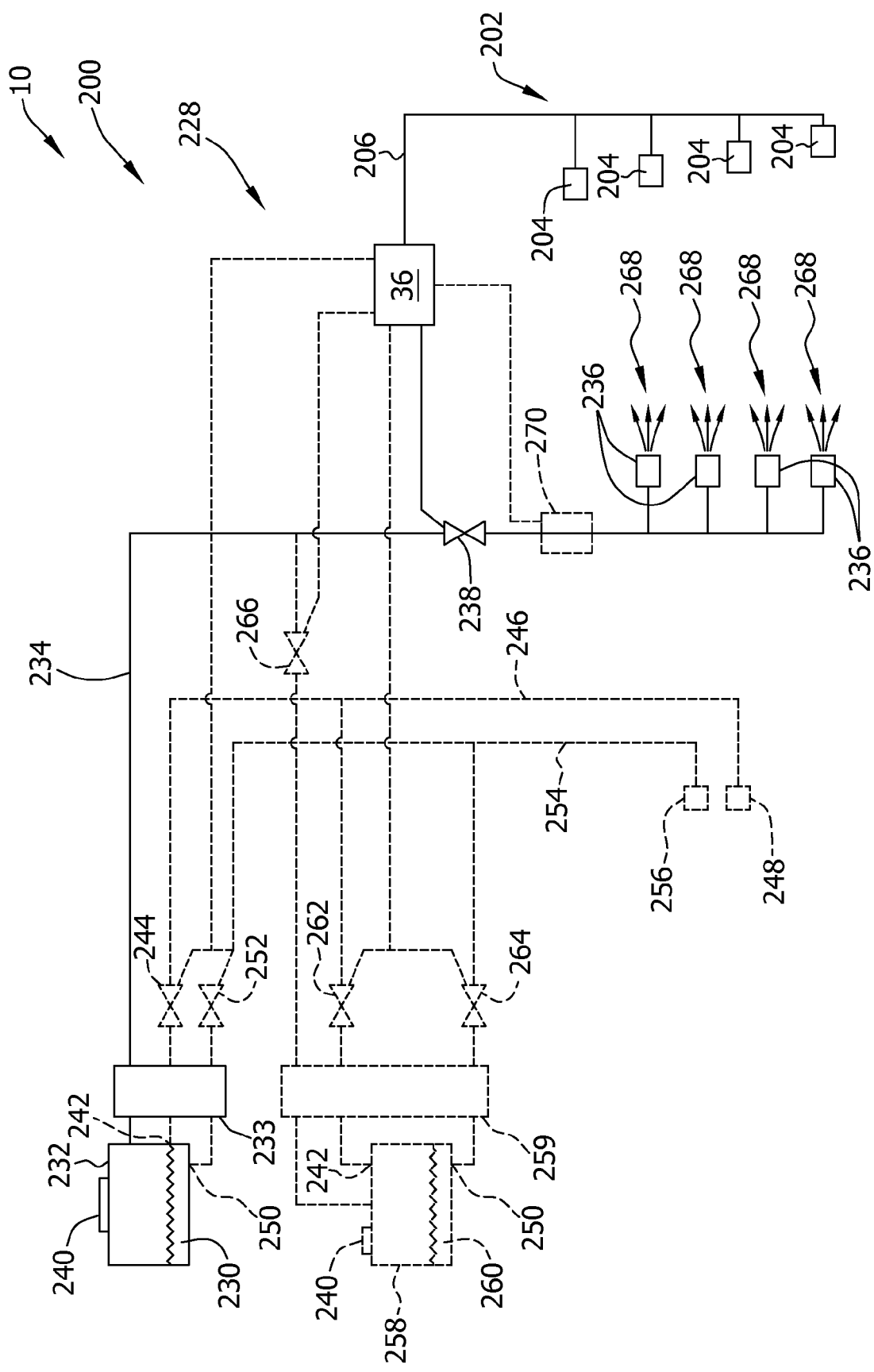

FIG. 4 is a schematic view of an exemplary alternative flow control system 200 that may be used with wind turbine 10. FIG. 5 is an enlarged cross-sectional view of a portion of flow control system 200. FIG. 6 is a schematic view of an exemplary fluid distribution system 228 that may be used with flow control system 200. Components shown in FIG. 1 are labeled with similar reference numbers in FIGS. 4-6. Additional and/or alternative components are indicated by dashed lines. In the exemplary embodiment, flow control system 200 is a zero-net-mass flow control system that includes an air distribution system 202. Control system 36 is in operational control communication with flow control system 200 and/or air distribution system 202.

Air distribution system 202 includes at least one actuator 204, at least one communication link 206, and at least one aperture 208. Actuator 204, communication link 206, and apertures 208 define an assembly 210. In the exemplary embodiment, each blade 22 includes a respective assembly 210. As such, in the exemplary embodiment, air distribution system 202 includes a plurality of actuators 204, communication links 206, and apertures 208. Alternatively, air distribution system 202 includes one common communication link 206 for assemblies 210. In an alternative embodiment, at least one blade 22 includes an assembly 210 having communication link 206. In one embodiment, communication link 206 provides operational control communication between control system 36 and at least one actuator 204. In the exemplary embodiment, communication link 206 provides operational control communication between control system 36 and a plurality of actuators 204 within an assembly 210. Communications links 206 may be directly coupled in communication with control system 36 and/or in communication with control system 36 via a communications hub and/or any other suitable communication device. In one embodiment, actuator 204, communication link 206, and/or aperture 208 are at least partially defined in blade 22.

Actuator 204 is, in the exemplary embodiment, any known or contemplated actuator configured to form a synthetic jet 212 of fluid. As used herein, the term "synthetic jet" refers to a jet of fluid that is created by cyclic movement of a diaphragm and/or piston 217, where the jet flow is synthesized from the ambient fluid. Synthetic jet 212 may be considered a fluid flow through flow control system 200. In one embodiment, actuator 204 includes a housing 216 and a diaphragm and/or a piston 217 within housing 216. Diaphragm and/or piston 217 can be mechanically, piezoelectrically, pneumatically, magnetically, and/or otherwise controlled to form synthetic jet 212. In the exemplary embodiment, actuator 204 is coupled to an interior surface 218 of blade 22 and is aligned with aperture 208 such that synthetic jet 212 and/or ambient air 214 flows through aperture 208.

Aperture 208 is defined within blade 22, and, more specifically, through an outer surface 220 of blade 22. Further, in the exemplary embodiment, at least one assembly 210 of air distribution system 202 includes a plurality of actuators 204 and a plurality of apertures 208. As such, air distribution system 202 includes an array 222 of apertures 208 defined through blade 22. In the exemplary embodiment, apertures 208 are defined along a suction side 224 of each blade 22. Although apertures 208 and/or actuators 204 are shown as being aligned in a line along suction sides 224, it should be understood that apertures 208 and/or actuators 204 may be positioned anywhere along suction side 224 of blade 22 that enables flow control system 200 to function as described herein. Additionally or alternatively, apertures 208 are defined through a pressure side 226 of blade 22, and/or actuators 204 are coupled to interior surface 218 of any suitable side of blade 22. In the exemplary embodiment, aperture 208 is configured to provide flow communication between a respective actuator housing 216 and ambient air 214.

Flow control system 200 also includes, in the exemplary embodiment, a fluid distribution system 228. In the exemplary embodiment, fluid 230 used within fluid distribution system 228 is, for example, water, a soap and/or a detergent, a non-freezing cleaning agent, a protein solvent, a de-icing agent, and/or a non-binding coating agent. In one embodiment, the soap and/or detergent is a foamed soap and/or detergent. When fluid 230 is a non-binding coating agent, fluid 230 is, for example, a hydrophobic surface coating, a drag reducing coating, an anti-fouling silicon coating, a nano-material coating, and/or a dirt-repellent coating, such as Teflon®, Mincor® TX TT, COL.9®, and/or Lexan®. Further, the non-binding coating agent can be applied to components of air distribution system 202, ducting, pumps, blowers, filters, and/or valves within wind turbine 10, and/or apertures 208 and/or a surface near aperture 208.

Fluid distribution system 228 includes a fluid container 232, a pump 233, and a conduit 234 in flow communication with fluid container 232. Pump 233 is configured to draw fluid 230 from container 232 for discharge into conduit 234. Conduit 234 is configured to channel fluid 230 to at least one nozzle 236, as described in more detail below. A valve 238 is coupled between pump 233 and nozzle 236 for selectively controlling a flow of fluid 230 to nozzle 236. Control system 36 is in operational control communication with pump 233 and/or valve 238 and is configured to control pump 233 and/or actuate valve 238. Alternatively, fluid distribution system 228 does not include pump 233 and fluid 230 is drawn from container 232 by centrifugal force. In the exemplary embodiment, fluid container 232 includes a fluid inlet 240 and is configured to contain or hold fluid 230. In the exemplary embodiment, fluid inlet 240 is defined through nacelle 16 and is configured to collect precipitation from ambient air 214. In one embodiment, fluid inlet 240 is configured to collect rain and/or snow in fluid container 232.

In an alternative embodiment, conduit 234 is in flow communication with a fluid supply system on, or under, the ground. The fluid supply system is configured to continuously supply a fluid to fluid distribution system 228. As such, fluid distribution system 228 may or may not include container 232 and/or pump 233. Rather, flow from the fluid supply system to conduit 234 is controlled by valve 238. Examples of the fluid supply system include a public water supply system and/or a dedicated fluid supply system within a wind farm.

Referring further to FIG. 6, in an alternative embodiment, fluid container 232 additionally, or alternatively, includes a fluid inlet 242 in flow communication, via a valve 244, with an intake conduit 246 that extends from nacelle 16, through tower 12, to an inlet opening 248 near supporting surface 14. In one embodiment, fluid container 232 additionally or alternatively includes a fluid outlet 250 in flow communication, via a valve 252, with an outlet conduit 254 that extends from nacelle 16, through tower 12, to an outlet opening 256 near supporting surface 14 (shown in FIG. 1). In one embodiment, fluid 230 is channeled through inlet opening 248 into intake conduit 246 to fluid container 232. Further, fluid 230 can be removed from fluid container 232 via outlet conduit 254 at outlet opening 256.

Control system 36 is in operational control communication with valves 244 and 252 for controlling a flow of fluid 230 through valves 244 and/or 252. In one embodiment, fluid 230 is delivered to intake conduit 246 and/or fluid 230 is removed from outlet conduit 254 via a truck, a boat, and/or suitable mobile vehicle or vessel. More specifically, the vehicle or vessel includes a container and a pumping device for pumping fluid from the vehicle or vessel container into fluid distribution system 228 via intake conduit 246 and/or for pumping fluid 230 from fluid container 232 into the vessel container via the outlet conduit 254.

Alternatively, fluid distribution system 228 includes more than one fluid container. For example, fluid distribution system 228 includes fluid container 232 and a second fluid container 258 and a second pump 259, shown in FIG. 6. Second fluid container 258 is configured to contain a second fluid 260. Second fluid 260 may be the same fluid as fluid 230 or a different fluid than fluid 230. Second fluid container 258 is configured similarly to fluid container 232 and includes fluid inlet 240 that can be configured to collect precipitation and/or fluid inlet 242 in flow communication with intake conduit 246 via a valve 262. Pump 259 is configured similarly to pump 233. Additionally, or alternatively, second fluid container 258 includes fluid outlet 250 in flow communication with outlet conduit 254 via a valve 264. Control system 36 is in operational control communication with valves 262 and/or 264, if present in fluid distribution system 228. Further, when more than one fluid container is present within fluid distribution system 228, second fluid container 258 is in flow communication with conduit 234 via a valve 266 that is controlled by control system 36. As such, fluid 230 and/or fluid 260 may be channeled to at least one nozzle 236 via conduit 234, singly, in combination, and/or in series.

In the exemplary embodiment, fluid distribution system 228 includes at least one nozzle 236 coupled to tower 12 and extending through outer surface 44 of tower 12. More specifically, nozzles 236 are coupled in tower 12 in positions that facilitate directing a stream 268 of fluid 230 toward at least one blade 22 as blade 22 passes tower 12. As such, nozzles 236 are configured to channel fluid 230 into air distribution system 202 via apertures 208 as blade 22 passes tower 12. It should be understood that while one valve 238 is described herein, fluid distribution system 228 can include a valve at each nozzle 236 for selectively discharging fluid 230 and/or second fluid 260 from nozzle 236 when fluid distribution system 228 includes more than one nozzle 236. In a particular embodiment, fluid distribution system 228 includes a temperature control device 270 operatively coupled to, such as positioned along, conduit 234 for adjusting a temperature of fluid 230 before fluid 230 enters nozzle 236. For example, temperature control device 270 heats fluid 230 before fluid 230 is channeled to nozzle 236. It should be understood that fluid distribution system 228 may include other suitable components for cleaning and/or maintaining components of wind turbine 10 depending on a configuration of wind turbine 10. For example, fluid distribution system 228 can be adapted for cleaning a leading edge of blade 22 and/or a hub enclosure, such as hub cover 132, by adding suitable pipes and/or conduits.

During a flow control operation, flow control system 200 is used to provide AFC for wind turbine 10. More specifically, control system 36 controls air distribution system 202 to draw in ambient air 214 and generate synthetic jet 212 through at least one aperture 208. Operation of one assembly 210 will be described herein, however, it should be understood that each assembly 210 functions similarly. Further, assemblies 210 can be controlled to operate in substantial synchronicity and/or each assembly 210 may be controlled separately such that a fluid flow about each blade 22 may be manipulated separately. When assemblies 210 are controlled in synchronicity, flow control system 200 can be controlled by control system 36 to maintain a predetermined load spectrum, power level, and/or noise level. In the exemplary embodiment, control system 36 instructs actuator 204 to alternately draw ambient air 214 into housing 216 (also referred to herein as a "breath-in stroke") and discharge synthetic jet 212 (also referred to herein as a "breath-out stroke") from housing 216 using diaphragm and/or piston 217 to generate synthetic jet 212 having one or more predetermined parameters, such as a velocity, a mass flow rate, a pressure, a temperature, and/or any suitable flow parameter. Synthetic jets 212 facilitate manipulating at least a boundary layer of a fluid flow across outer surface 220 of blade 22. More specifically, discharging synthetic jets 212 at suction side 224 of blade 22 increases the lift on blade 22, which increases the power generated by wind turbine 10. It should be understood that any suitable control methods and/or components, such as pitching blade(s) 22, can alternatively or additionally be used to control a load spectrum, a power level, and/or a noise level of wind turbine 10.

FIG. 7 is a flowchart of a method 300 for operating wind turbine 10 (shown in FIG. 1). By performing method 300, fouling of blade 22 (shown in FIG. 1) and/or flow control system 100 (shown in FIG. 2) and/or flow control system 200 (shown in FIG. 4) is facilitated to be corrected and/or prevented. Method 300 is performed by control system 36 (shown in FIG. 1) sending commands and/or instructions to components of wind turbine 10, such as air distribution system 102 and/or 202 (shown in FIGS. 2 and 4), valves 142, 148, 156, 166, 168, 170, 172, 182, 238, 244, 252, 262, 264, and/or 266 (shown in FIGS. 3 and 6), and/or any other suitable component. Processor 40 (shown in FIG. 1) within control system 36 is programmed with code segments configured to perform method 300. Alternatively, method 300 is encoded on a computer-readable medium that is readable by control system 36. In such an embodiment, control system 36 and/or processor 40 is configured to read computer-readable medium for performing method 300.

In the exemplary embodiment, method 300 is performed periodically according to a predetermined corrective schedule, a predetermined preventative schedule, condition-triggered automated operation, and/or condition-triggered manual operation. In a particular embodiment, control system 36 performs method 300 after control system 36 and/or a human operator determines optimal conditions exist, such as a low power-generating time period, low wind speed time period, high wind speed time period, and/or another optimal time period, for performing method 300. Alternatively, or additionally, control system 36 is configured to determine when fouling has occurred and/or will occur and perform method 300 upon making such a determination. In the exemplary embodiment, method 300 is also performed to correct and/or prevent an icing condition on blade 22 by using a de-icing agent, such as an alcohol, as fluid 136 and/or fluid 230 (shown in FIGS. 3 and 6). Further, method 300 is performed to prevent fouling of blade 22 and/or flow control system 100 and/or 200 by using the non-binding coating agent described above to form a non-binding surface layer on blade 22 and/or within flow control system 100 and/or 200. Method 300 used for de-icing and/or for forming a non-binding surface layer can be performed according to a predetermined seasonal schedule by control system 36 and/or selectively by an operator of control system 36.

Control system 36 can be further configured to control and/or vary a flow rate of fluid 136 and/or fluid 230 into flow control system 100 and/or 200; to control a flow of fluid 136 and/or fluid 230 to be intermittent, continuous, and/or sequentially; and/or to terminate use of flow control system 100 and/or 200 such that fluid 136 and/or fluid 230 can soak at least some components of flow control system 100 and/or 200 before a second fluid is applied and/or fluid 136 and/or 230 is dried. In one embodiment, control system 36 controls flow control system 100 and/or 200 to operate to dry fluid 136 and/or 230 remaining within flow control system 100 and/or 200.

Referring to FIGS. 1-3 and 7, in one embodiment when nonzero-net-mass flow control system 100 is used within wind turbine 10, method 300 includes operatively coupling 301 fluid container 138 within wind turbine 10 such that fluid container 138 is in flow communication with air distribution system 102, which is at least partially defined within blade 22 of wind turbine 10. Method 300 further includes channeling 302 fluid 136 from fluid container 138 into air distribution system 102. Channeling 302 fluid 136 includes, in one embodiment, channeling 302 fluids 136 and 164 into air distribution system 102. When more than one fluid 136 and 164 is channeled 302 to air distribution system 102, fluid 136 and 164 are channeled 302 to air distribution system 102 singly, in combination, and/or in a series or sequence. For example, when fluid 136 is water and fluid 164 is soap, fluid 136 is channeled 302 to pre-rinse blade 22 and/or flow control system 100, fluid 164 is channeled 302 to clean blade 22 and/or flow control system 100, and then fluid 136 is again channeled 302 to rinse blade 22 and/or flow control system 100. After blade 22 and/or flow control system 100 has been cleaned, a third fluid may then be channeled 302 to form a non-binding surface layer on blade 22 and/or in flow control system 100.

Further, when nonzero-net-mass flow control system 100 is used within wind turbine 10, channeling 302 includes channeling 302 fluid 136 into air distribution system 134 from inside of blade 22 in the exemplary embodiment. More specifically, fluid 136 is channeled 302 from fluid container 138 to flow control device 104 of air distribution system 102, and fluid 136 is then discharged from flow control device 104 into a respective manifold 106. As discussed above, manifold 106 is in flow communication with flow control device 104 and at least one aperture 108. When fluid 136 is channeled to flow control device 104 and discharged into manifold 106, fluid 136 contacts surfaces of components within flow control device 104 and surfaces of manifold 106 for cleaning and/or other coating of surfaces of flow control device 104 and/or manifold 106. Alternatively, fluid 136 is channeled 302 from fluid container 138 into manifold 106 without contacting the surfaces of the components within flow control device 104. Bypass of flow control device 104 can be used when operation of at least one component of flow control device 104 may be adversely affected by contact with fluid 136.

In addition to, or as alternative to, channeling fluid 136 to air distribution system 102 from inside blade 22, fluid 136 is channeled to at least one nozzle 176 defined within tower 12, and then channeled 302 into air distribution system 102 from outside of blade 22. More specifically, after fluid 136 is channeled to nozzle 176, fluid 136 is ejected from nozzle 176 as stream 178 toward at least one aperture 108 defined through blade 22. In one embodiment, nozzles 176 are located with respect to tower 12 based on an expected wind direction when nozzles 176 are to be used, for example, the expected wind direction during the time of the year when the fouling load is expected to be the highest. However, if nacelle 16 has yawed such that blades 22 are not aligned with nozzles 176, control system 36 controls the yaw of nacelle 16 to position the blades 22 adjacent nozzles 176 and/or controls a rotation of rotor 18 to facilitate directing fluid stream 178 toward blades 22. Alternatively, control system 36 determines when blades 22 are adjacent nozzles 176 and performs a cleaning process based on the determination.

In the exemplary embodiment, control system 36 is configured to time the ejection of fluid 136 with a rotation of blade 22 such that fluid 136 is intermittently ejected from nozzle 176. As such, fluid 136 is not wasted by ejecting fluid 136 when blade 22 is not aligned with nozzle 176 to receive fluid 136. Alternatively, fluid 136 is continuously ejected from nozzle 176 for a predetermined period of time. In the exemplary embodiment, a velocity difference between blade 22 and fluid stream 178 causes friction between outer surface 126 of blade 22 and droplets of fluid 136 to scrub, clean with force, buff, cleanse, polish, rub, and/or wash outer surface 126. Such velocity difference can be controlled by controlling a speed of blade 22 and/or fluid flow characteristics of fluid stream 178.

Additionally or alternatively, fluid 136 is further channeled 302 into air distribution system 102 by operating flow control device 104 to draw air 128 and at least a portion of fluid stream 178 into air distribution system 102 through aperture 108. More specifically, flow control device 104 is controlled to reverse a direction of fluid flow 112 as compared to normal active flow control operations. As such, fluid 136 is channeled 302 into air distribution system 102 via aperture 108. Flow control device 104 can be operated to draw fluid 136 at least partially into manifold 106 and/or into flow control device 104 for cleaning and/or maintenance of flow control system 100. After flow control device 104 has drawn in air and/or fluid 136, flow control device 104 reverses the direction of fluid flow 112 to discharge 304 air and/or fluid 136 from aperture 108 into ambient air 128. During such discharge 304, a velocity and/or a mass flow rate of fluid flow 112 can be increased for a period of time.

Fluid 136 is then discharged 304 from air distribution system 102 through at least one aperture 108 to facilitate removing debris from air distribution system 102. More specifically, fluid 136 is channeled 302 to air distribution system 102 for interaction with debris within flow control system 100. After fluid 136 interacts with debris, fluid 136 having debris suspended, dissolved, and/or otherwise contained therein, is discharged 304 from air distribution system 102 for removing debris from flow control system 100. In a particular embodiment, fluid 136 is heated 306 prior to channeling 302 fluid 136 into air distribution system 102 using temperature control device 174.

Further, for channeling 302 fluid 136 from outside of blade 22 into air distribution system 102 via nozzle 176, fluid 136 is preserved by timing the ejection of fluid with the passage of blade 22 by nozzle 176. Further, the operating conditions of wind turbine 10 should facilitate cleaning. Examples of operating condition that facilitate cleaning include, without limitation, optimal rotational speed of blades 22, reversing the direction of fluid flow 112 for at least a portion of the cleaning action, and/or any other suitable operating condition that enables method 300 to be performed as described herein. Moreover, to include only one set of nozzles 176 on tower 12, nozzles 176 may be mounted in a position that corresponds with a wind direction during which cleaning is needed. For example, if insects are the main debris load, the location of nozzles 176 should correspond to the appropriate weather conditions and wind direction.

Referring to FIGS. 1 and 4-7, in an alternative embodiment, when zero-net-mass flow control system 200 is used within wind turbine 10, method 300 includes operatively coupling 301 fluid container 232 within wind turbine 10 such that fluid container 232 is in flow communication with air distribution system 202, which is at least partially defined within blade 22 of wind turbine 10. Method 300 further includes channeling 302 fluid 230 from fluid container 232 into air distribution system 202. More specifically, in one embodiment, fluids 230 and 260 are channeled 302 into air distribution system 202. When more than one fluid is channeled 302 to air distribution system 202, fluid 230 and fluid 260 are channeled 302 to air distribution system 202 singly, in combination, and/or in a series or sequence, as described in more detail above.

Further, when zero-net-mass flow control system 200 is used within wind turbine 10, fluid 230 is channeled 302 into air distribution system 202 from outside of blade 22. More specifically, fluid 230 is channeled to at least one nozzle 236 defined within tower 12, and then channeled 302 into air distribution system 202 from outside of blade 22. In one embodiment, nozzles 236 are located with respect to tower 12 based on an expected wind direction when nozzles 236 are to be used, for example, the expected wind direction during the time of the year when the fouling load is expected to be the highest. However, if nacelle 16 has yawed such that blades 22 are not aligned with nozzles 236, control system 36 controls the yaw of nacelle 16 to position the blades 22 adjacent nozzles 236 and/or controls a rotation of rotor 18 to facilitate directing fluid stream 268 toward blades 22. Alternatively, control system 36 determines when blades 22 are adjacent nozzles 236 and performs a cleaning process based on the determination.

In the exemplary embodiment, after fluid 230 is channeled to nozzle 236, fluid 230 is ejected from nozzle 236 as stream 268 toward at least one aperture 208 defined through outer surface 220 of blade 22. Control system 36 is configured to time the ejection of fluid 230 with a rotation of blade 22 such that fluid 230 is intermittently ejected from nozzle 236. As such, fluid 230 is not wasted by ejecting fluid 230 when blade 22 is not in a path of fluid ejection. Alternatively, fluid 230 is continuously ejected from nozzle 236 for a period of time. In the exemplary embodiment, a velocity difference between blade 22 and fluid stream 268 causes friction between outer surface 220 of blade 22 and droplets of fluid 230 to scrub, clean with force, buff, cleanse, polish, rub, and/or wash outer surface 220. Such velocity difference can be controlled by controlling a speed of blade 22 and/or fluid flow characteristics of fluid stream 268.

In the exemplary embodiment, fluid 230 is further channeled 302 into air distribution system 202 by operating actuator 204 to draw air 214 and at least a portion of fluid stream 268 into air distribution system 202 through aperture 208. Ejection of fluid 230 from nozzle 236 may be timed with actuator 204 operations. More specifically, actuator 204 is controlled to perform a breath-in stroke as aperture 208 passes through fluid stream 268. As such, fluid 230 is channeled 302 into air distribution system 202 via aperture 208. Actuator 204 can be operated to draw fluid 230 at least partially into housing 216 for cleaning and/or maintenance of flow control system 200. After actuator 204 has drawn in air and/or fluid 230, actuator 204 performs a breath-out stroke to discharge 304 air and/or fluid 230 from aperture 208 into ambient air 214. During such discharge 304, a velocity and/or a mass flow rate of synthetic jet 212 can be increased for a predetermined period of time by controlling operation of diaphragm and/or piston 217.

Fluid 230 is then discharged 304 from air distribution system 202 through at least one aperture 208 to facilitate removing debris from air distribution system 202. More specifically, fluid 230 is channeled 302 to air distribution system 202 for interaction with debris within flow control system 200. After fluid 230 interacts with debris, fluid 230 having debris suspended, dissolved, and/or otherwise contained therein, is discharged 304 from air distribution system 202 for removing debris from flow control system 200. In a particular embodiment, fluid 230 is heated 306 prior to channeling 302 fluid 230 into air distribution system 202 using temperature control device 270.

Further, for channeling 302 fluid 230 from outside of blade 22 into air distribution system 202 via nozzle 236, fluid 230 is preserved by timing the ejection of fluid with the passage of blade 22 by nozzle 236. Further, the operating conditions of wind turbine 10 should facilitate cleaning. Examples of such operating conditions includes, without limitation, optimal rotational speed of blades 22, reversing the direction of synthetic jet 212 for at least a portion of the cleaning action, and/or any other suitable operating condition that enable method 300 to be performed as described herein. Moreover, to include only one set of nozzles 236 on tower 12, nozzles 236 may be mounted in a position that corresponds with a wind direction during which cleaning is needed. For example, if insects are the main debris load, the location of nozzles 236 should correspond to the appropriate weather conditions and wind direction. Additionally, for oscillating actuators 204, the breath-in stroke may be timed with the passage of blade 22 by nozzle 236.

The above-described methods and systems facilitate correcting and/or preventing fouling of an airfoil and/or an active flow control (AFC) system used with the blade. As such, the embodiments described herein facilitate more wide-spread use of AFC in, for example, wind turbine applications. The above-described systems provide an automatic and/or remote controlled method of correcting and/or preventing fouling of an AFC system by using a control system located at least partially within a wind turbine to perform the methods described herein. As such, the AFC system is not required to be only cleaned and/or maintained manually at the wind turbine. The above-described control system facilitates reducing human operator intervention when fouling has taken place and/or will take place. Further, the systems described herein allow for cleaning and/or maintenance of the AFC system and/or wind turbine during optimal operating conditions, such as low power-generating time periods, such that the impact of performing cleaning and/or maintenance on the energy production of the wind turbine is minimized.

A technical effect of the systems and method described herein includes at least one of: (a) channeling a fluid from a fluid container into an air distribution system at least partially defined within a blade of the wind turbine; (b) discharging the fluid from the air distribution system through at least one aperture of the air distribution system to facilitate removing debris from the air distribution system, wherein the aperture is defined through an outer surface of the blade; (c) channeling the fluids from the fluid container into a manifold of the air distribution system, wherein the manifold is in flow communication with the aperture; (d) channeling the fluid from the fluid container to a flow control device of the air distribution system; (e) ejecting the fluid from at least one nozzle defined within a tower of the wind turbine toward the aperture; and (f) drawing air and at least a portion of the ejected fluid into the air distribution system through the aperture to channel the fluid into the air distribution system.

Exemplary embodiments of methods and systems for operating a wind turbine are described above in detail. The methods and systems are not limited to the specific embodiments described herein, but rather, components of the systems and/or steps of the methods may be utilized independently and separately from other components and/or steps described herein. For example, the methods may also be used in combination with other active flow control systems, and are not limited to practice with only the wind turbine systems as described herein. Rather, the exemplary embodiment can be implemented and utilized in connection with many other fouling correction and/or prevention applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine, said method comprising:
   operatively coupling a fluid container within the wind turbine, the fluid container in flow communication with an air distribution system at least partially defined within a blade of the wind turbine;
   channeling a fluid from the fluid container into the air distribution system, the fluid including at least a liquid fluid; and,
   discharging the fluid from the air distribution system through at least one aperture of the air distribution system to facilitate removing debris from the air distribution system, the aperture defined through an outer surface of the blade.

2. A method in accordance with claim 1, wherein channeling a fluid from a fluid container into an air distribution system comprises channeling the fluid from the fluid container into a manifold of the air distribution system, the manifold in flow communication with the aperture.

3. A method in accordance with claim 1, wherein channeling a fluid from a fluid container into an air distribution system comprises:
   channeling the fluid from the fluid container to a flow control device of the air distribution system; and,
   discharging the fluid from the flow control device into a manifold of the air distribution system, the manifold providing flow communication between the flow control device and the aperture.

4. A method in accordance with claim 1, wherein channeling a fluid from a fluid container into an air distribution system comprises channeling at least one of water, soap, a detergent, a foamed cleaning agent, a protein solvent, a de-icing agent, and a non-binding coating agent into the air distribution system.

5. A method in accordance with claim 1, wherein channeling a fluid from a fluid container into an air distribution system comprises:
   ejecting the fluid from at least one nozzle defined within a tower of the wind turbine toward the aperture; and,
   drawing air and at least a portion of the ejected fluid into the air distribution system through the aperture to channel the fluid into the air distribution system.

6. A method in accordance with claim 1, further comprising heating the fluid prior to channeling the fluid into the air distribution system.

7. A fluid distribution system for use in a wind turbine including an air distribution system at least partially defined within a blade of the wind turbine, the air distribution system configured to channel air through the wind turbine, said fluid distribution system in flow communication with the air distribution system, said fluid distribution system comprising:

a fluid container operatively coupled within the wind turbine, said fluid container comprising a fluid inlet and containing a fluid therein, the fluid comprising a liquid fluid;

a conduit in flow communication with said fluid container and the air distribution system, said conduit configured to channel the fluid from said fluid container into the air distribution system for discharge through at least one aperture of the air distribution system to facilitate removing debris from the air distribution system; and, a pump configured to discharge the fluid from said fluid container into said conduit.

8. A fluid distribution system in accordance with claim 7, wherein said conduit is in flow communication with a manifold of the air distribution system providing flow communication between said fluid container and the aperture.

9. A fluid distribution system in accordance with claim 7, wherein said conduit is in flow communication with a flow control device of the air distribution system, said flow control device providing flow communication between said fluid container and the aperture.

10. A fluid distribution system in accordance with claim 7, wherein said conduit is in flow communication with a nozzle defined in a tower of the wind turbine, said nozzle configured to channel said fluid into the aperture by ejecting the fluid toward the aperture, wherein the air distribution system is configured to draw in air and at least a portion of said ejected fluid into the air distribution system through the aperture.

11. A fluid distribution system in accordance with claim 7, wherein said fluid container is configured to collect precipitation.

12. A fluid distribution system in accordance with claim 7, wherein said fluid container is in flow communication with an intake conduit extending through a tower of the wind turbine.

13. A fluid distribution system in accordance with claim 7, further comprising a control system in control communication with said fluid distribution system and the air distribution system, said control system configured to:
channel the fluid from said fluid container into the air distribution system; and,
discharge the fluid from the air distribution system through the aperture to facilitate removing the debris from the air distribution system.

14. A fluid distribution system in accordance with claim 7, further comprising:
a first fluid container configured to contain a first fluid;
a first valve coupled to an outlet of said first fluid container;
a second fluid container configured to contain a second fluid; and,
a second valve coupled to an outlet of said second fluid container,
wherein said first valve and said second valve are in flow communication with said conduit, said first valve and said second valve configured to selectively channel at least one of said first fluid and said second fluid into the air distribution system.

15. A wind turbine, comprising:
at least one blade;
an air distribution system at least partially defined within said at least one blade, said air distribution system comprising at least one aperture defined through an outer surface of said blade, said air distribution system configured to channel air to said at least one aperture; and,
a fluid distribution system in flow communication with said air distribution system and configured to facilitate removing debris from said air distribution system, said fluid distribution system comprising:
a fluid container operatively coupled within said wind turbine, said fluid container containing a fluid comprising at least one of a cleaning fluid and a surface-coating fluid;
a conduit in flow communication with said fluid container and said air distribution system, said conduit configured to channel the fluid from said fluid container into said air distribution system for discharge through said aperture; and,
a pump configured to discharge the fluid from said fluid container into said conduit.

16. A wind turbine in accordance with claim 15, further comprising a nacelle, said fluid container positioned within the nacelle.

17. A wind turbine in accordance with claim 15, wherein said wind turbine comprises a plurality of blades, said air distribution system comprising a plurality of manifolds and a plurality of flow control devices, each manifold of said plurality of manifolds defined within a respective blade and each flow control device of said plurality of flow control devices coupled within a respective blade, and said fluid distribution system comprising a plurality of conduits, each conduit of the plurality of conduits in flow communication with at least one of a respective flow control device and a respective manifold.

18. A wind turbine in accordance with claim 15, further comprising at least one nozzle defined within a tower of said wind turbine, said nozzle configured to channel the fluid into said aperture by ejecting the fluid toward said aperture, wherein said air distribution system is configured to draw in air and at least a portion of the ejected fluid into said air distribution system through said aperture.

19. A wind turbine in accordance with claim 15, further comprising a control system in control communication with said fluid distribution system and said air distribution system, said control system configured to:
channel the fluid from said fluid container into said air distribution system; and,
discharge the fluid from said air distribution system through said aperture to facilitate removing the debris from said air distribution system.

* * * * *